(12) United States Patent
Tobias et al.

(10) Patent No.: US 7,689,990 B2
(45) Date of Patent: Mar. 30, 2010

(54) METHOD, SYSTEM AND PROGRAM FOR MANAGING EXECUTABLE TASKS

(75) Inventors: Craig Anthony Tobias, Brooklin (CA); Mark Maurice Mezofenyi, Toronto (CA); Jason Michael Gartner, Markham (CA); Belal Ahmed Tassi, Markham (CA)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 11/090,407

(22) Filed: Mar. 25, 2005

(65) Prior Publication Data

US 2006/0218554 A1    Sep. 28, 2006

(51) Int. Cl.
G06F 9/46 (2006.01)
G06F 17/00 (2006.01)
(52) U.S. Cl. .................. 718/100; 715/273; 715/277
(58) Field of Classification Search ......... 718/100–104, 718/106; 715/273–277; 714/100
See application file for complete search history.

(56) References Cited

U.S. PATENT DOCUMENTS

| | | | |
|---|---|---|---|
| 4,845,644 A | 7/1989 | Anthias et al. | |
| 5,826,078 A | 10/1998 | Funaki | |
| 6,035,264 A * | 3/2000 | Donaldson et al. | 702/182 |
| 6,044,394 A | 3/2000 | Cadden et al. | |
| 6,137,470 A | 10/2000 | Sundstrom et al. | |
| 6,289,368 B1 | 9/2001 | Dentler et al. | |
| 6,314,446 B1 | 11/2001 | Stiles | |
| 6,343,333 B1 * | 1/2002 | Matsumoto et al. | 719/320 |
| 6,470,375 B1 | 10/2002 | Whitner et al. | |
| 2002/0156671 A1 * | 10/2002 | Libra et al. | 705/9 |
| 2004/0107277 A1 | 6/2004 | Levesque et al. | |

OTHER PUBLICATIONS

Hands on Linux; Mark G. Sobell; 1998; ISBN: 0-201-32569-1; pp. 201, 645-647, 764-765, 804, 826-829, 883-885, 854-855.*
Potterton et al. "A Graphical User Interface to the CCP4 Program Suite", ACTA Cryst., 2003, pp. 1-8.*

* cited by examiner

Primary Examiner—Meng-Ai An
Assistant Examiner—Jennifer N To
(74) Attorney, Agent, or Firm—Sughrue Mion, PLLC

(57) ABSTRACT

Disclosed herein are a data processing system implemented method, a data processing system and an article of manufacture for managing a plurality of data processing system executable tasks each having a script associated therewith. The data processing system includes a task selector for selecting, from the plurality of computer executable tasks, a selection of tasks, a script selector for selecting scripts, the selected scripts associated with the selected selection of tasks, and a script editor for editing the selected scripts, the edited selected scripts being executable by the data processing system.

9 Claims, 6 Drawing Sheets

METHOD, SYSTEM AND PROGRAM FOR MANAGING EXECUTABLE TASKS

FIELD OF INVENTION

The present invention relates to the field of computer executable tasks. In particular, to a method, a data processing system, and an article of manufacture for managing data processing system executable tasks.

BACKGROUND

Computing platforms execute software implemented applications that are often referred to as tasks. A computing platform can execute a number of tasks in succession including some executing concurrently. A user of such a computing platform will want to execute one or more tasks, view the progress of each task, prioritize executing tasks, determine if tasks have succeeded or failed, and repeat these same tasks several times with the same or different input parameters.

It is known to provide a task management application with a user interface that allows a human operator (user) to view the identifying information, current or completion status, and other useful information with respect to executing task and recently completed tasks. An example of such a task management application is provided by the Microsoft® Windows® Task Manager. The Windows® Task Manager allows a user to view a list of executing tasks (applications) and to terminate execution of a designated task. Once a task has terminated, no information regarding the task is available in the Windows® Task Manager.

Typically the information presented in the user interface of a task management application is read-only. That is, the user can not interact with the information presented in the interface for the purpose of manipulating it or perform actions on it. The information provided is commonly sufficient to identify a task but does not include details of parameters (inputs) provided to the task on execution. Therefore, the information is not always sufficient to permit the user to re-execute a displayed task.

What is required is a task management application with a user interface that permits a user to manipulate information presented in the interface and to re-execute tasks based on the parameters previously provided to the task.

SUMMARY OF INVENTION

In accordance with one aspect of the present invention, there is provided a data processing system for managing a plurality of data processing system executable tasks each having a script associated therewith, the data processing system including a task selector for selecting, from the plurality of computer executable tasks, a selection of tasks, a script selector for selecting scripts, the selected scripts associated with the selected selection of tasks, and a script editor for editing the selected scripts, the edited selected scripts being executable by the data processing system.

In accordance with another aspect of the present invention, there is provided a data processing system implemented method for managing a plurality of data processing system executable tasks each having a script associated therewith, the method including selecting, from the plurality of computer executable tasks, a selection of tasks, selecting scripts, the selected scripts associated with the selected selection of tasks, and editing the selected scripts, the edited selected scripts being executable by the data processing system.

In accordance with another aspect of the present invention, there is provided an article of manufacture for directing a data processing system to manage a plurality of data processing system executable tasks each having a script associated therewith, the article of manufacture including a program usable medium embodying one or more instructions executable by the data processing system, the one or more instructions including data processing system executable instructions for selecting, from the plurality of computer executable tasks, a selection of tasks, data processing system executable instructions for selecting scripts, the selected scripts associated with the selected selection of tasks, and data processing system executable instructions for editing the selected scripts, the edited selected scripts being executable by the data processing system.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

The present invention will be described in conjunction with drawings in which.

DETAILED DESCRIPTION

In an exemplary embodiment of the present invention, a data processing system provides for displaying, to a user, information regarding currently executing and previously completed (executed) tasks, on a data processing system, and for allowing the user to manipulate the information and re-execute one or more selected tasks. The data processing system can include a collection of computing platforms operatively connected in a networked configuration.

Figure 1:
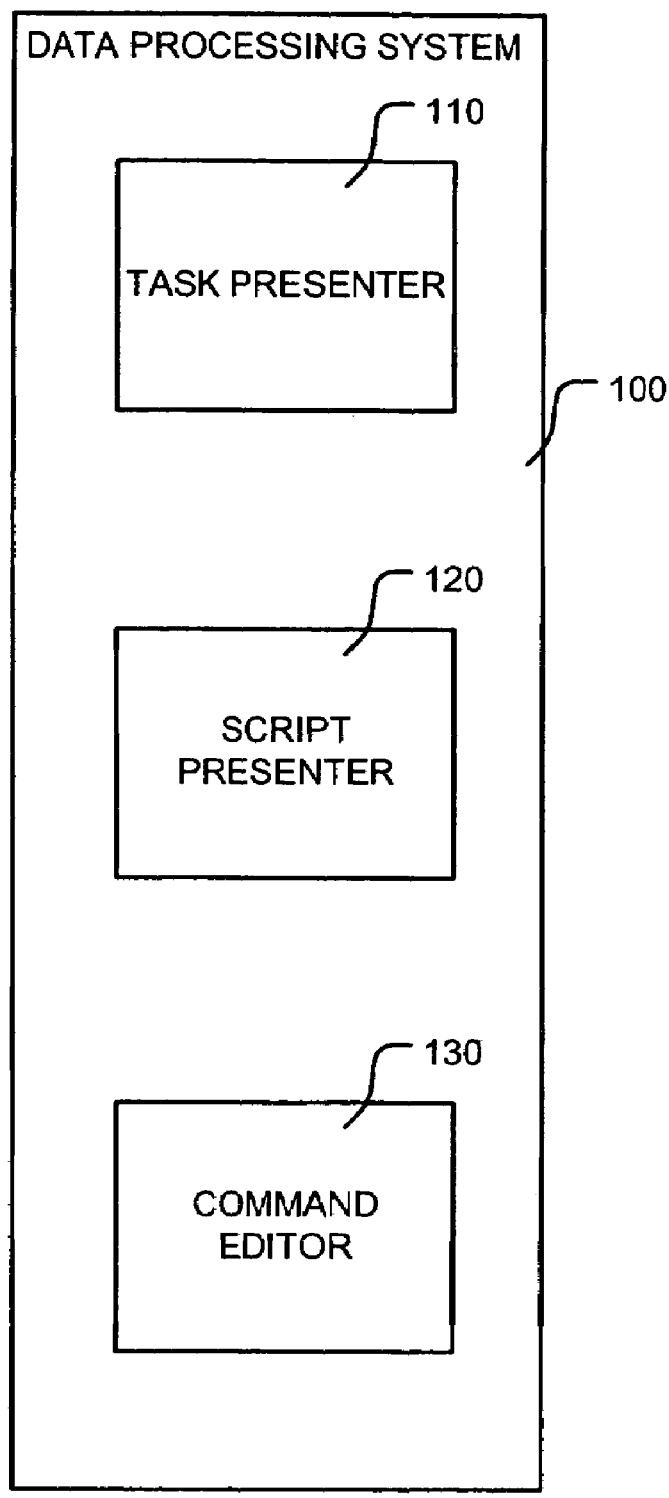
FIG. 1 is a schematic representation of an exemplary embodiment of a data processing system of the present invention.

FIG. 1 is a schematic representation of an exemplary embodiment of the data processing system 100 of the present invention. The data processing system 100 can comprise a task presenter 110, a script presenter 120 and a command editor 130. The task presenter 110 can present an interactive visual representation of currently executing and previously completed tasks on the data processing system. Completed tasks can include tasks that terminated in any of the following cases: normally, prematurely, prior to successful completion, and as the result of an exception or other similar terminating event. The script presenter 120 can present a human (user) readable representation of a script corresponding to a task selected in the task presenter 110 representation of tasks. The command editor 130 can provide for the user to combine and edit the scripts corresponding to the selected tasks and to cause execution of the edited scripts.

Figure 2:
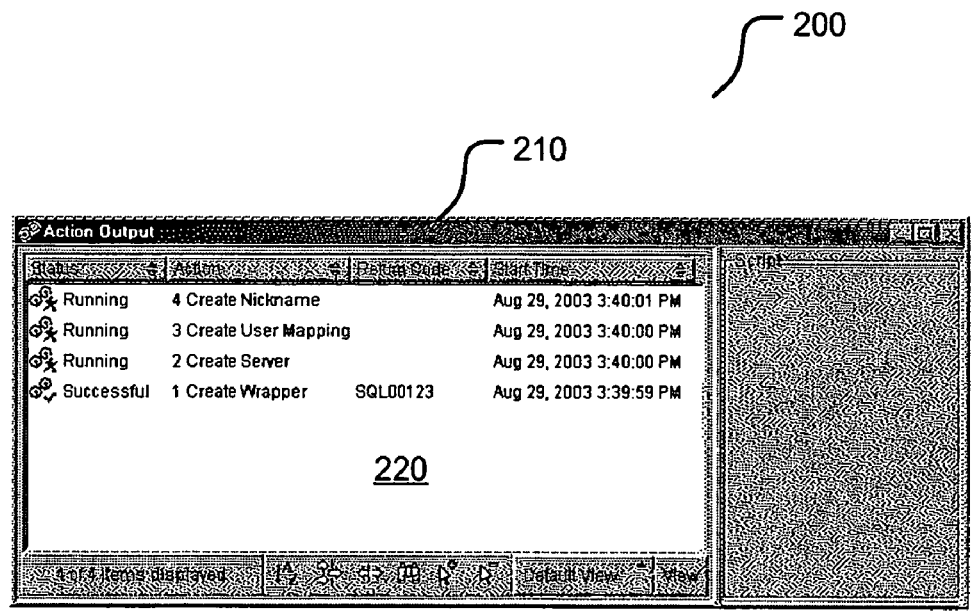
FIG. 2 is a representation of an exemplary visual interface provided by an exemplary embodiment of the task presenter of the present invention.

FIG. 2 is a representation of an exemplary visual interface 200 provided by the task presenter 110. The visual interface includes a graphical user interface (GUI) window such as an Action Output window 210. The Action Output window 210 includes a task list area 220 that can display information for a plurality of tasks arranged with a row for each task. Each row can contain fields of information including a task identifying field (Action), a task status field (Status), a completion/termination result field (Return Code), a start of execution time field (Start Time), and other similar fields of information with respect to each task. The Status field can take on values such as, for example, "Running", "Successful", "Warning" and "Failed". The Action Output window 210 can be interactive and can provide for the user to select one or more of the tasks (the selected task or the selected tasks) using commonly known GUI mechanisms for making a selection.

Figure 3:
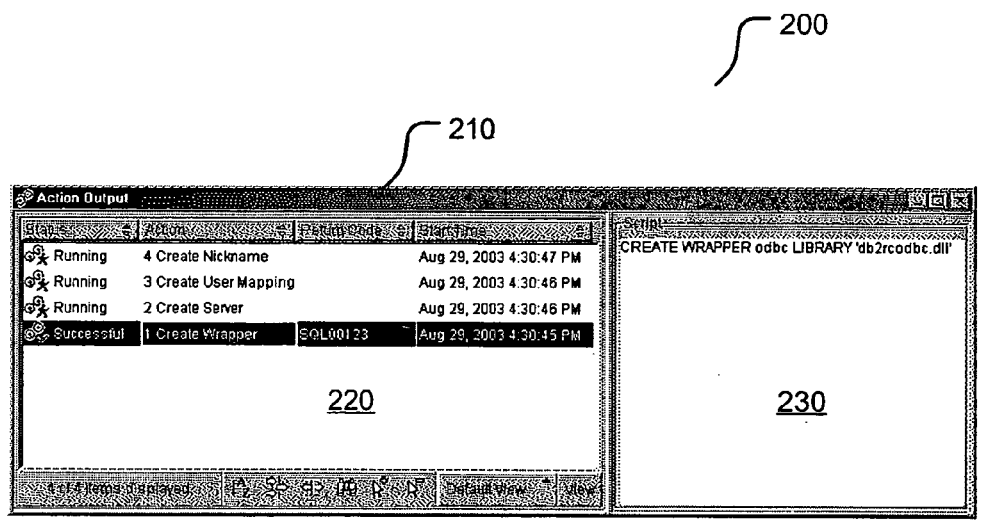
FIG. 3 is another representation of an exemplary visual interface provided by an exemplary embodiment of the task presenter of the present invention showing content in a script window provided by an exemplary embodiment of the script presenter of the present invention.

FIG. 3 is another representation of the exemplary visual interface 200 provided by the task presenter 110 showing content in a Script area 230 provided by the script presenter 120. The content in the Script area 230 is a computer executable script that corresponds to the selected task in the task list area 220. The computer executable script in the Script area 230 is presented in a human readable format. The command editor 130 can be invoked on the script shown in the Script area 230. The command editor 130 provides for the user to edit the script. A script editing mechanism can be included in the command editor 130. In an alternative embodiment, the command editor 130 can provide for the editing of the script using another mechanism such as, for example, a script editor, a program editor, a text editor and other similar editing mechanisms. When editing of the script is complete, the command editor 130 can provide for the execution of the edited script. The executed script can appear as a new task in the task list area 220.

Figure 4:
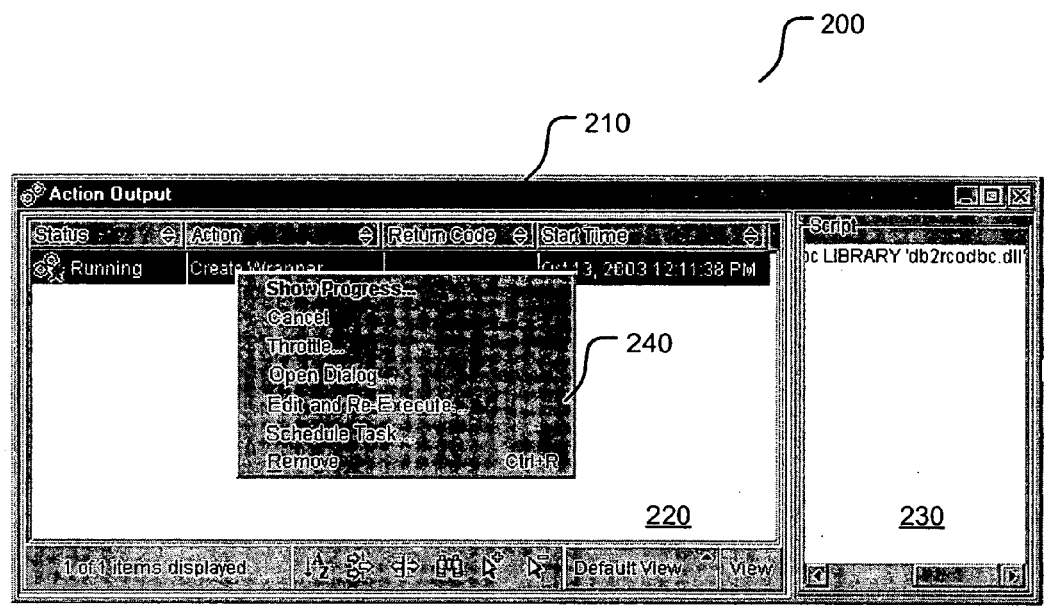
FIG. 4 is a further representation of an exemplary visual interface provided by an exemplary embodiment of the task presenter of the present invention showing a menu of operations.

FIG. 4 is a further representation of the exemplary visual interface 200 provided by the task presenter 110 showing a menu of operations. When a task is selected in the task list area 220, the data processing system 100 provides for a user designated operation to be applied to the selected task. The user designates the operation by selecting from a plurality of operation selections 240 using a common mechanism such as, for example, a drop-down menu, a pop-up menu and other similar selection mechanisms. The plurality of operation selections 240 can be a function of a state of the selected task. The state of the selected task can coincide with the status for the selected task or in an alternative embodiment the state and status can take on a unique range of values. For illustrative purposes herein, the state of the selected task takes on the same range of values as the status. For example, operation selections for a selected task having a state of "Running" can include: "Cancel", "Show Progress", "Throttle", "Edit and Re-execute" and "Schedule Task"; while operation selections for a selected task having a state of "Successful", "Warning" or "Failed" can include: "Remove", "Edit and Re-execute" and "Schedule Task". The operation "Cancel" can terminate an executing task; the entry (row) corresponding to the task will remain in the task list area 220. The operation "Show Progress" can display detailed progress of the executing task. The operation "Throttle" can cause the data processing system to increase or decrease the allocation of resources to the executing task. The operation "Edit and Re-execute" can invoke the command editor 130 on the script corresponding to the selected task; operation of the command editor 130 is described above. The operation "Schedule Task" can allow the user to schedule the selected task for execution at a designated date and time. The operation "Remove" can remove the entry (row) in the task list area 220 corresponding to the selected task.

In an alternative embodiment of the present invention, the task presenter 110 provides for the user to select multiple tasks in the task list area 220. When multiple tasks are selected, the script presenter 120 can present scripts corresponding to each of the selected tasks allowing the user to, for example, combine the scripts. Also when multiple tasks are selected, a user designated operation can be applied to each of the selected tasks.

Figure 5:
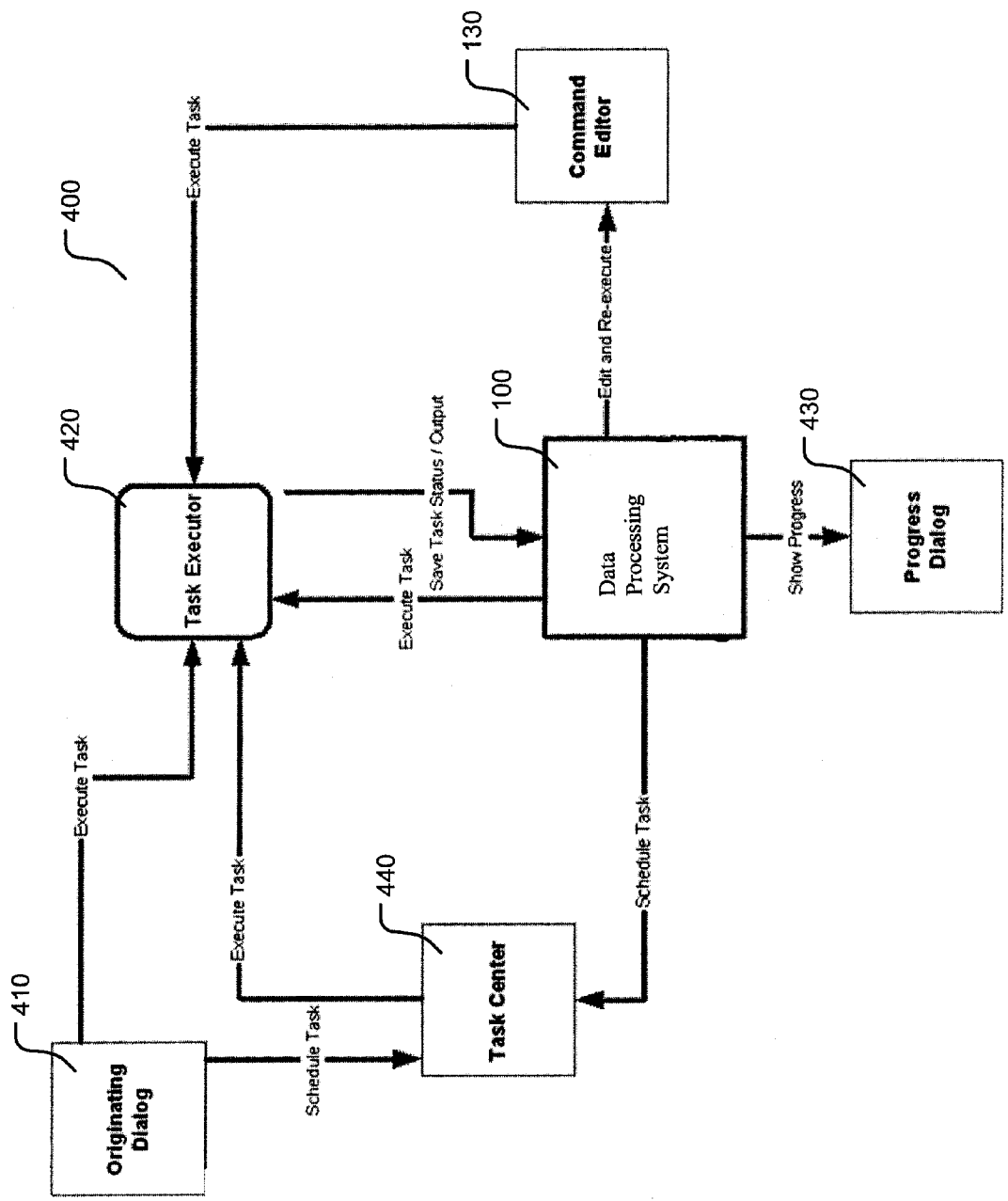
FIG. 5 is a schematic representation of an exemplary lifecycle of a task in accordance with the present invention.

FIG. 5 is a schematic representation of an exemplary lifecycle 400 of a task in accordance with the present invention. The lifecycle 400 begins with an originating dialog 410 where parameters for the yet to be executed task are established by the user. When the parameters have been established, the task can be sent to a task executor 420 for execution. Task status information for the executing task or a task output (i.e. return code) when the task has terminated execution can be sent to the data processing system 100. The data processing system 100 can, responsive to an operation selection of "Show Progress" by the user, invoke a progress dialog 430. The data processing system 100 can, responsive to an operation selection of "Edit and Re-execute" by the user, invoke the command editor 130. When the user has edited the script corresponding to the task, the task can be sent to the task executor 420 for execution. The data processing system 100 can, responsive to an operation selection of "Schedule Task" by the user, send the task to a task center 440. The task center 440 can send the task to the task executor 420 at a date and time designated by the user. The originating dialog 410 can also send the task to the task center 440 for deferred execution at a designated date and time as an alternative to sending the task directly to the task executor 420. When the user has confirmed or amended the parameters, the originating dialog 410 can again send the task to the task executor 420 or alternatively the task center 440.

Figure 6:
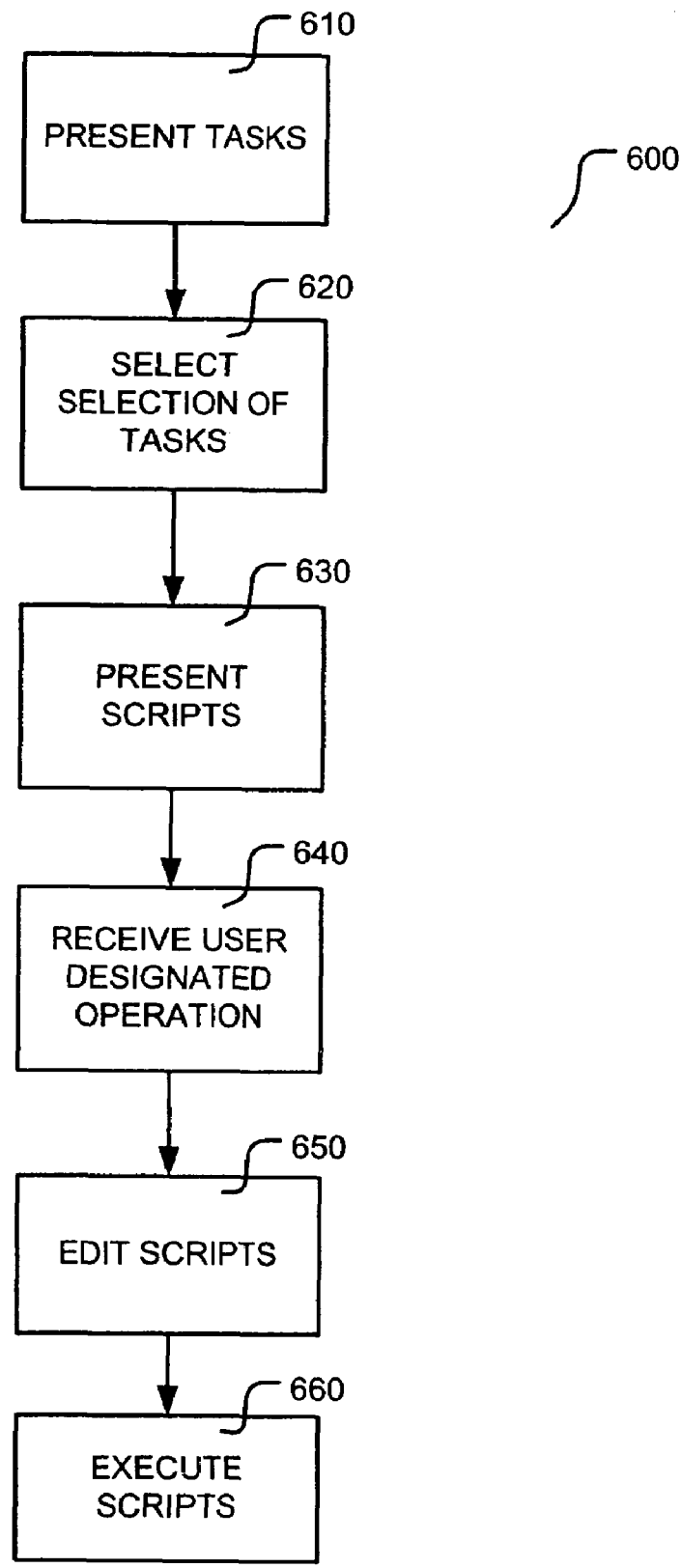
FIG. 6 is a flow chart representing steps in an exemplary embodiment of a method according to the present invention.

FIG. 6 is a flow chart representing steps in an exemplary embodiment of a method 600 according to the present invention. The method 600 can be implemented, for example, using a task manger 100 such as that described above and represented in FIG. 1. In step 610 of the method 600, information for the plurality of tasks is presented, for example, in a GUI Action Output window 210 having a task list area 220 with a row for each task. Each row can contain fields of information including a task identifying field (Action), a task status field (Status), a completion/termination result field (Return Code), a start of execution time field (Start Time), and other similar fields of information with respect to each task. The Status field can take on values such as, for example, "Running", "Successful", "Warning" and "Failed". The Action Output window 210 can be interactive and can provide for the user to select one or more of the tasks 620 (the task selection) using commonly known GUI mechanisms for making a selection. Computer executable scripts that correspond to the task selection in the task list area 220 can be presented 630 in the Script area 230. The computer executable scripts in the Script area 230 are presented in a human readable format. When tasks are selected in the task list area 220, a user designated operation to be applied to the selected tasks can be received 640. The user designates the operation by selecting from a plurality of operation selections 240 using a common mechanism such as, for example, a drop-down menu, a pop-up menu and other similar selection mechanisms. The plurality of operation selections 240 can be a function of a state of the selected tasks.

When the user designated operation is the "Edit and Re-execute" operation (described above), the user can edit the scripts 650 using, for example, the command editor 130. When editing of the scripts is completed, the task can be sent to, for example, the task executor 420 for execution 660.

In an alternative embodiment, the method 600 according to the present invention can be implemented using a program usable medium embodying one or more instructions, executable by the data processing system 100, corresponding to the steps of the method 600.

It will be apparent to one skilled in the art that numerous modifications and departures from the specific embodiments described herein may be made without departing from the spirit and scope of the present invention.

The invention claimed is:

1. A data processing system implemented method for managing a plurality of data processing system executable tasks each having a script associated therewith, the method comprising:

presenting a list of computer executable tasks;

selecting, from the list of the computer executable tasks, a selection of tasks;

receiving a user input designating an operation from a plurality of operations to be applied to the selection of tasks, wherein the plurality of operations are selected as a function of a state of selected tasks, wherein the state of the selected tasks and a status of the selected tasks is a unique range of values;

presenting scripts corresponding to the selected selection of tasks and selecting at least one script from the presented scripts, wherein no more than one script corresponds to each task;

editing the at least one selected script;

executing the at least one edited script by the data processing system; and presenting the at least one executed script as at least one new executable task in the list of computer executable tasks for further operation.

2. The method of claim 1, wherein the selecting from the list of the computer executable tasks comprises presenting, for each of the plurality of data processing system executable tasks, any one of: a status of a task, an action name identifying the task, a return code resulting from the execution of the task, or any combination thereof.

3. The method of claim 1, wherein the plurality of operations comprises at least one of: canceling the tasks in the selection, displaying execution progress information for the tasks in the selection, changing execution priority for the tasks in the selection, removing the tasks in the selection from the plurality of computer executable tasks, launching an interactive application for manipulating the scripts corresponding to the tasks in the selection, launching the command editor on the scripts corresponding to the tasks in the selection, scheduling execution of the tasks in the selection at a user designated time, and any combination thereof.

4. A data processing system for managing a plurality of data processing system executable tasks each having a script associated therewith, the data processing system comprising:

a processor; and a memory including software instructions that cause the data processing system to implement:

a task selector for presenting a list of computer executable tasks, selecting, from the list of the computer executable tasks, a selection of tasks, and receiving a user input designating an operation from a plurality of operations to be applied to the selection of tasks, wherein the plurality of operations are selected as a function of a state of selected tasks, wherein the state of the selected tasks and a status of the selected tasks is a unique range of values;

a script selector for presenting scripts corresponding to the selected selection of tasks and selecting at least one script from the presented scripts, wherein no more than one script corresponds to each task; and a script editor for editing the at least one selected script, wherein:

the at least one edited script is executed by the data processing system; and the at least one executed script is presented as at least one new executable task in the list of computer executable tasks for further operation.

5. The data processing system of claim 4, wherein the task selector presents, for each of the plurality of data processing system executable tasks, any one of: a status of a task, an action name identifying the task, a return code resulting from the execution of the task, or any combination thereof.

6. The data processing system of claim 4, wherein the plurality of operations comprises at least one of: canceling the tasks in the selection, displaying execution progress information for the tasks in the selection, changing execution priority for the tasks in the selection, removing the tasks in the selection from the plurality of computer executable tasks, launching an interactive application for manipulating the scripts corresponding to the tasks in the selection, launching the command editor on the scripts corresponding to the tasks in the selection, scheduling execution of the tasks in the selection at a user designated time, and any combination thereof.

7. An article of manufacture including a program having instructions stored in a computer storage when executed by a data processing system for directing the data processing system to manage a plurality of data processing system executable tasks each having a script associated therewith, the article of manufacture comprising:

instructions for presenting a list of computer executable tasks;

instructions for selecting, from the list of the computer executable tasks, a selection of tasks;

instructions for receiving a user input designating an operation from a plurality of operations to be applied to the selection of tasks, wherein the plurality of operations are selected as a function of a state of selected tasks, wherein the state of the selected tasks and a status of the selected tasks is a unique range of values;

instructions for presenting scripts corresponding to the selected selection of tasks and selecting at least one script from the presented scripts, wherein no more than one script corresponds to each task;

instructions for editing the at least one selected script;

instructions for executing the at least one edited script by the data processing system; and instructions for presenting the at least one executed script as at least one new executable task in the list of computer executable tasks for further operation.

8. The article of manufacture of claim 7, wherein the instructions for selecting from the list of the computer executable tasks comprises presenting, for each of the plurality of data processing system executable tasks, any one of: a status of a task, an action name identifying the task, a return code resulting from the execution of the task, or any combination thereof.

9. The article of manufacture of claim 7, wherein the plurality of operations comprises at least one of: canceling the tasks in the selection, displaying execution progress information for the tasks in the selection, changing execution priority for the tasks in the selection, removing the tasks in the selection from the plurality of computer executable tasks, launching an interactive application for manipulating the scripts corresponding to the tasks in the selection, launching the command editor on the scripts corresponding to the tasks in the selection, scheduling execution of the tasks in the selection at a user designated time, and any combination thereof.

* * * * *